United States Patent
Hajjar et al.

(10) Patent No.: US 9,607,577 B2
(45) Date of Patent: Mar. 28, 2017

(54) DYNAMIC POWER AND BRIGHTNESS CONTROL FOR A DISPLAY SCREEN

(75) Inventors: Roger Hajjar, San Jose, CA (US); Anand Budni, Karnataka (IN)

(73) Assignee: PRYSM, INC., San Jose, CA (US)

( * ) Notice: Subject to any disclaimer, the term of this patent is extended or adjusted under 35 U.S.C. 154(b) by 1153 days.

(21) Appl. No.: 13/153,304

(22) Filed: Jun. 3, 2011

(65) Prior Publication Data

US 2011/0298843 A1  Dec. 8, 2011

Related U.S. Application Data

(60) Provisional application No. 61/352,297, filed on Jun. 7, 2010.

(30) Foreign Application Priority Data

Apr. 15, 2011 (IN) ............................. 1111/DEL/2011

(51) Int. Cl.
G09G 5/10 (2006.01)
G06F 3/14 (2006.01)
G09G 3/02 (2006.01)

(52) U.S. Cl.
CPC ............. *G09G 5/10* (2013.01); *G06F 3/1446* (2013.01); *G09G 3/025* (2013.01); *G09G 2320/0626* (2013.01); *G09G 2320/0673* (2013.01); *G09G 2330/021* (2013.01); *G09G 2330/025* (2013.01); *G09G 2360/16* (2013.01)

(58) Field of Classification Search
CPC .. G09G 5/10; G09G 3/025; G09G 2320/0626; G09G 2320/0673; G09G 2330/021; G09G 2330/025; G09G 2360/16; G09F 3/1446

USPC .................................. 345/1.1, 211–214, 690
See application file for complete search history.

(56) References Cited

U.S. PATENT DOCUMENTS

| | | | |
|---|---|---|---|
| 4,368,485 A * | 1/1983 | Midland | 348/799 |
| 6,501,441 B1 * | 12/2002 | Ludtke et al. | 345/1.1 |
| 2004/0201582 A1 * | 10/2004 | Mizukoshi et al. | 345/211 |
| 2008/0266332 A1 * | 10/2008 | Inoue et al. | 345/690 |
| 2008/0291140 A1 * | 11/2008 | Kent et al. | 345/83 |
| 2008/0297448 A1 * | 12/2008 | Mizukoshi et al. | 345/76 |
| 2009/0167751 A1 * | 7/2009 | Kerofsky | 345/214 |

FOREIGN PATENT DOCUMENTS

| | | |
|---|---|---|
| CN | 1841478 A | 10/2006 |
| CN | 101385234 A | 3/2009 |

OTHER PUBLICATIONS

Office Action for Chinese Patent Application No. 201110209414.1 (PRSM/0009CN) dated Aug. 26, 2013.

* cited by examiner

*Primary Examiner* — Mark Regn
(74) *Attorney, Agent, or Firm* — Patterson & Sheridan, LLP

(57) ABSTRACT

An image is displayed on an electronic display device at a reduced power level. Power used by the display device is maintained below a predetermined maximum power level by uniformly scaling the initial optical intensity of an image to a lower optical intensity whenever displaying the image at the initial optical intensity would result in power consumption of the display device exceeding the predetermined maximum power level.

34 Claims, 6 Drawing Sheets

DYNAMIC POWER AND BRIGHTNESS CONTROL FOR A DISPLAY SCREEN

CROSS-REFERENCE TO RELATED APPLICATIONS

This application claims the benefit of India application number 1111/DEL/2011, filed Apr. 15, 2011, which claims benefit of U.S. provisional patent application Ser. No. 61/352,297, filed Jun. 7, 2010. Both of these related applications are hereby incorporated herein by reference.

BACKGROUND OF THE INVENTION

Field of the Invention

Embodiments of the present invention generally relate to display screens, and more specifically, to methods of dynamically controlling power consumed by and brightness of display screens.

Description of the Related Art

Electronic display systems are commonly used to display information from computers and other sources. Typical display systems range in size from small displays used in mobile devices to very large displays, such as tiled displays, that are used to display images to thousands of viewers at one time. Reduced power consumption is one desirable feature of such displays, both because of the long-term energy savings provided to the user and because of the reduced cost and complexity of installation associated with systems having lower power requirements.

Some technologies for electronic display systems, such as laser phosphor displays (LPDs) and organic light-emitting diodes (OLEDs), are able to significantly reduce power consumption by using a "color adding" approach to produce color at each pixel on the viewing surface. Specifically, red, green, and blue light energy is generated at a given pixel to produce the desired brightness and hue for that pixel. Thus, the power use of LPDs, OLED displays, and the like is proportional to the total optical energy produced by the viewing surface of the display. This is in contrast to display systems that produce color at each pixel on the viewing surface by selectively filtering or blocking light of different colors, such as a digital light processing (DLP) display. In such systems, white light source, such as an incandescent bulb, is set at full intensity at all times in such a display system. As such, there is no reduction in power consumption when the system is producing darker images or images that do not require all three colors.

When averaged over a large number of images or over a relatively long time interval, the power consumption of LPDs, OLED-based display screens, and other display systems that use a color-adding approach to produce color can be substantially less than that of other display technologies. However, such display systems provide less energy savings when most or all of a particular image being displayed is relatively bright. Thus, when displaying brighter images, less energy savings are provided to the user by color-adding display systems.

In addition, in a tiled display system, power usage by the tiled display system may exceed available power, when they are displaying bright images. This may be true even in tiled systems employing LPDs. Upgrading the power supply to such a system may be an option, but it can be costly. The other option is to recalibrate the system to a lower maximum power level but this affects the quality of low brightness images and the dynamic range.

As the foregoing illustrates, there is a need in the art for a method of displaying an image with an electronic display device while staying within the maximum available power.

SUMMARY OF THE INVENTION

One or more embodiments of the invention provide methods of dynamically controlling the power consumed by, and brightness of images rendered on, an electronic display device. In one embodiment, power consumed by the display device is reduced by uniformly scaling down the brightness of the rendered image in accordance with predefined settings so that power consumption of the display device stays within a predetermined maximum power level.

A method of displaying an image on an electronic display system, according to an embodiment of the invention, includes the steps of receiving frames of image data to be displayed, determining an average power level for displaying one or more frames of image data, and adjusting a parameter of the electronic display system, such as a power level or a brightness level, in accordance with the average power level. The average power level may be determined based on a single frame of image data or multiple frames of image data.

A method of displaying an image on a laser phosphor display device having a plurality of laser sources, according to an embodiment of the invention, includes the steps of receiving frames of image data to be displayed, determining an average power level for displaying one or more frames of image data, and modulating the laser sources in accordance with the average power level. The laser sources are modulated in accordance with a plurality of maximum intensity settings, each of which is set based on the average power level, and the maximum intensity settings are predefined to increase as the average power level decreases.

A method of displaying images on a display device, according to an embodiment of the invention, includes the steps of receiving an input representing one or more images to be displayed, determining a display value based on the input, comparing the display value against a threshold value, and adjusting a parameter of the display device based on the comparison. In one embodiment, the display value is a power value and the threshold value is a maximum allowed power value. In another embodiment, the display value is a display output intensity value and the threshold value is a maximum allowed brightness value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
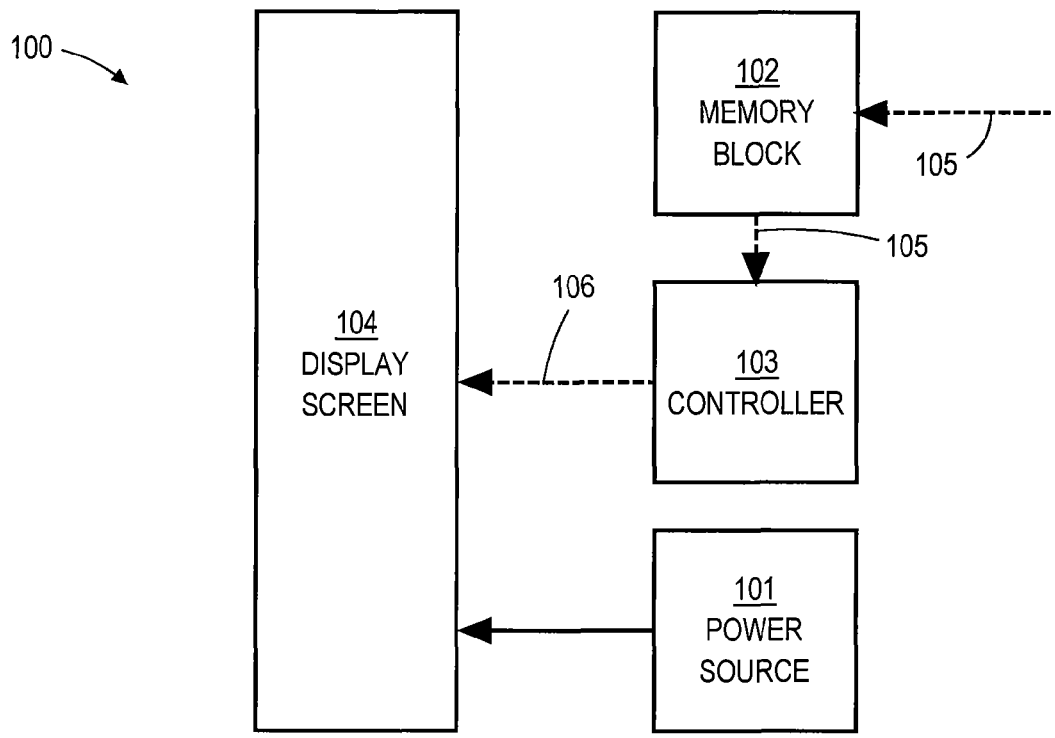
FIG. 1 is a block diagram of a display system that may benefit from embodiments of the invention.

FIG. 1 is a block diagram of a display system 100 that may benefit from embodiments of the invention. Display system 100 may be used to display a series of images, also referred to as frames, to produce a video sequence, or alternatively, a single static image. Display system 100 includes a power source 101, a memory block 102, a controller 103, and a display screen 104. Power source 101 may be a conventional electrical outlet, such as a 110 VAC or 220 VAC electrical outlet, a hard-wired electrical connection, or other electrical connection that provides the requisite voltage and amperage for the proper operation of display system 100. Memory block 102 may include DRAM, flash memory, or other memory devices for retaining image data 105 that is used to construct one or more images to be displayed by display system 100. Controller 103 may include one or more appropriate processors for converting image data 105 in memory block 102 to output signal 106, including general purpose processors such as micro-processors, digital signal processors (DSP), and special purpose processors, such as an application specific integrated circuits (ASICs). Display screen 104 may be a laser phosphor display (LPD) screen, an organic light-emitting diode (OLED) based display screen, or other electronic display screen that generates a combination of different colors of light, e.g., red, green, and blue, at each pixel to produce the desired brightness and hue for that pixel. For example, a pixel of display screen 104 may include a red, a green, and a blue (RGB) sub-pixel, which are used to generate the requisite red, green, and blue light that, in combination, produces the desired hue and brightness for the pixel. In an LPD, such subpixels may be a phosphor material that is excited by a laser pulse. In an OLED-based display screen, such subpixels may be comprised of polymeric conducting and emissive layers positioned between an anode and a cathode. Display screen 104 may be based on other technologies as well, such as a light-emitting diode (LED) array.

In operation, display system 100 receives and stores image data 105 in memory block 102. Image data 105 includes digital information for constructing a single static image to be displayed by display system 100 or a video sequence comprising a series of frames to be displayed by display system 100. Image data 105 includes information such as optical intensity of each subpixel of display screen 104 to produce the desired image or frame. Controller 103 extracts image data 105 for a single video frame or static image from memory block 102, and calculates the total power required for display system 100 to display the frame or image. Controller 103 then compares the calculated power to a pre-determined maximum allowable power limit, i.e., a "power ceiling," for display system 100. If the calculated power exceeds the maximum allowable power limit, controller 103 uniformly dims the frame or image by scaling the brightness of each pixel and subpixel accordingly, so that the total power used by display system 100 is below the power ceiling for display system 100 to produce the image. Controller 103 then sends output signal 106 to display screen 104, which produces the image. Output signal 106 includes the control signals required to produce the image at a power below the maximum allowable power limit for display system 100.

Figure 2:
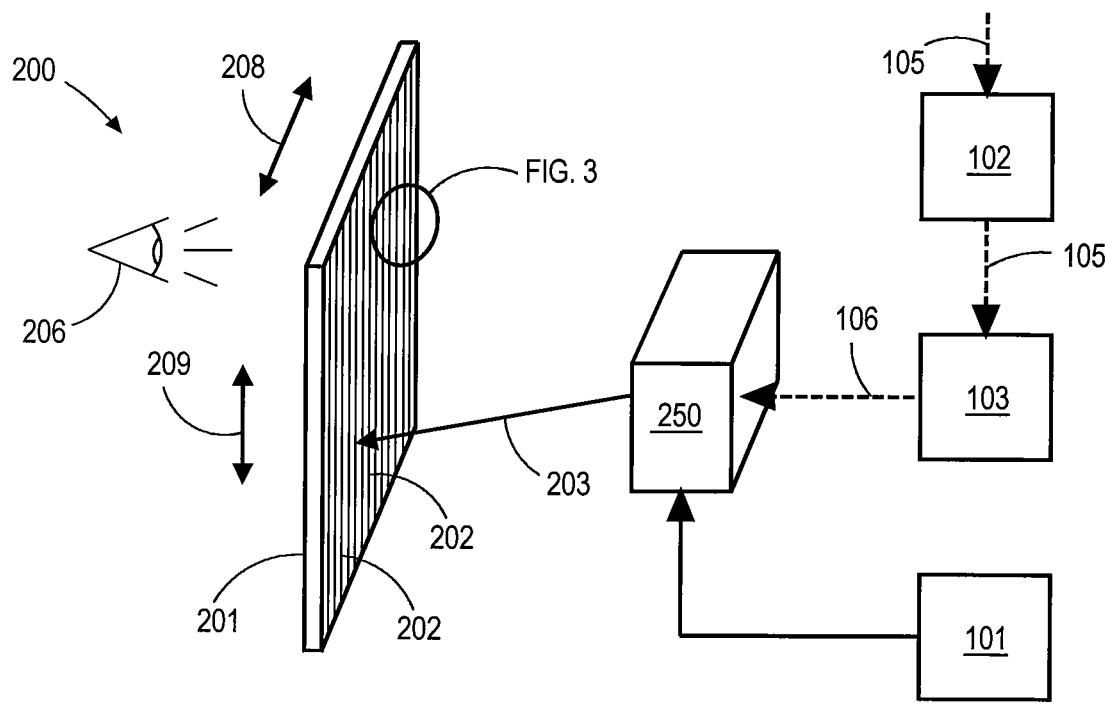
FIG. 2 is a schematic diagram of an exemplary laser-phosphor display (LPD) having a screen with phosphor stripes and a laser module that is used to produce one or more scanning laser beams to excite the phosphor material on the screen.

According to one or more embodiments of the invention, display system 100 in FIG. 1 may be an LPD-based display system. FIG. 2 is a schematic diagram of an exemplary LPD 200 having a screen 201 with phosphor stripes 202 and a laser module 250 that is used to produce one or more scanning laser beams 203 to excite the phosphor material on screen 201. Phosphor stripes 202 are made up of alternating phosphor stripes of different colors, e.g., red, green, and blue, where the colors are selected so that they can be combined to form white light and other colors of light. Scanning laser beam 203 is a modulated light beam that is scanned across screen 201 along two orthogonal directions, e.g., horizontally 208 and vertically 209, in a raster scanning pattern to produce an image on screen 201 for audience 206.

Figure 3:
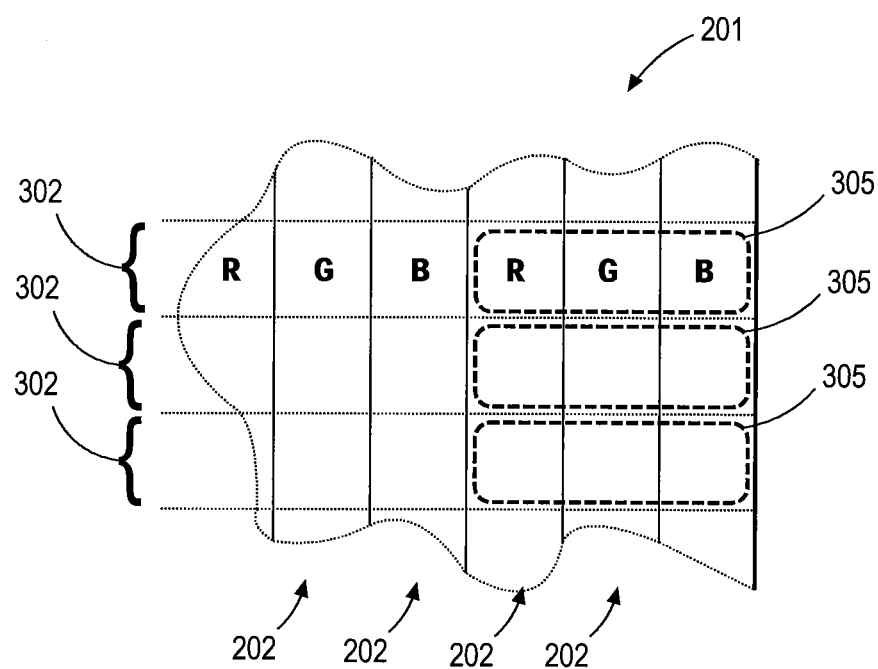
FIG. 3 is a partial schematic diagram of the portion of a screen indicated in FIG. 2.

FIG. 3 is a partial schematic diagram of the portion of screen 201 indicated in FIG. 2. FIG. 3 illustrates pixel elements 305, which each include a portion of a red, green, and blue phosphor stripe 202. The portion of the phosphor stripes 202 that belong to a particular pixel element 305 is defined by the laser scanning paths 302, as shown. Laser module 250 forms an image on screen 201 by directing scanning laser beam 203 along the laser scanning paths 302 and modulating scanning laser beam 203 to deliver a desired amount of optical energy to each of the red, green, and/or blue phosphor stripes 202 found within each pixel element 305. Each image pixel element 305 outputs light for forming a desired image by the emission of visible light created by the selective laser excitation of each phosphor-containing stripe in a given pixel element 305. Thus, modulation of the red, green, and blue portions of each pixel element 305 control the composite color and image intensity at each image pixel element location.

In FIG. 3, one dimension of the pixel region is defined by the width of the three phosphor stripes 202, and the control of the laser beam spot size defines the orthogonal dimension. In other implementations, both dimensions of image pixel element 305 may be defined by physical boundaries, such as separation of phosphor stripes 202 into rectangular phosphor-containing regions. In one embodiment, each of phosphor stripes 202 are spaced at about a 500 μm to about 550

µm pitch, so that the width of pixel element 305 is on the order of about 1500 µm. In another embodiment, each of phosphor stripes 202 are spaced at a pitch between about 125 µm and about 1000 µm.

Figure 4:
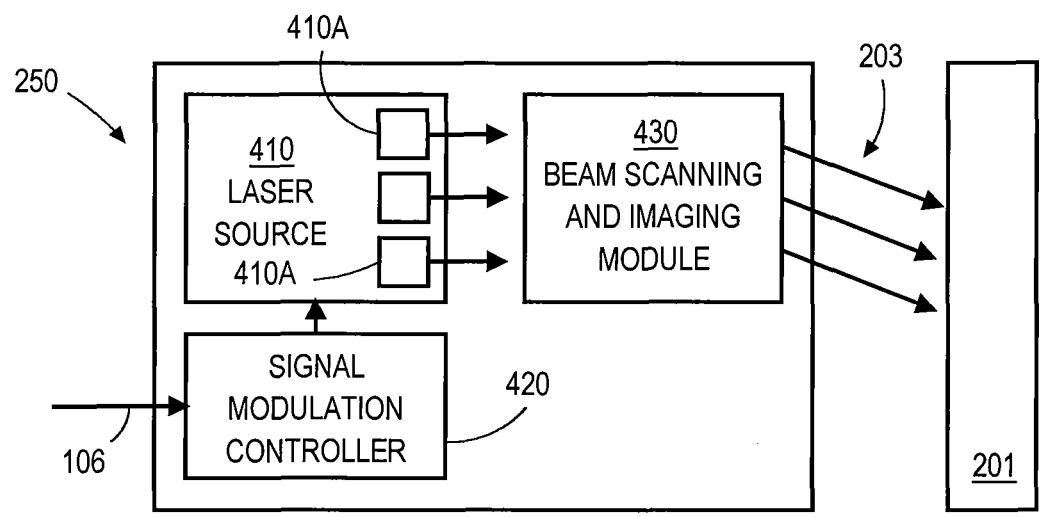
FIG. 4 is a block diagram of a laser module in FIG. 2.

FIG. 4 is a block diagram of laser module 250 in FIG. 2. Laser module 250 includes a signal modulation controller 420, which modulates the output of a laser source 410 directly to control the energy delivered to each of the phosphor stripes 202 found within each pixel element 305. For example, the signal modulation controller 420 may control the driving current of a laser diode, which is found in the laser source 410. A beam scanning and imaging module 430 projects the modulated beam, i.e., scanning laser beam 203, to screen 201 to excite the color phosphors. Alternatively, laser source 410 is used to generate a continuous wave (CW) un-modulated laser beam and an optical modulator (not shown) is used to modulate the generated CW laser beam with the image signals in red, green and blue. In this configuration, a signal modulation controller is used to control the optical modulator. For example, an acousto-optic modulator or an electro-optic modulator may be used as the optical modulator. In one embodiment, laser source 410 further comprises two or more ultraviolet lasers 410A that are used in conjunction with other components in laser module 250 to deliver an array of beams to the phosphor regions disposed on screen 201. An example of a laser based display system is further described in the commonly assigned U.S. patent application Ser. No. 12/123,418, entitled "Multilayered Screens with Light-Emitting Stripes for Scanning Beam Display Systems," filed May 19, 2008, which is incorporated herein in its entirety.

Figure 5:
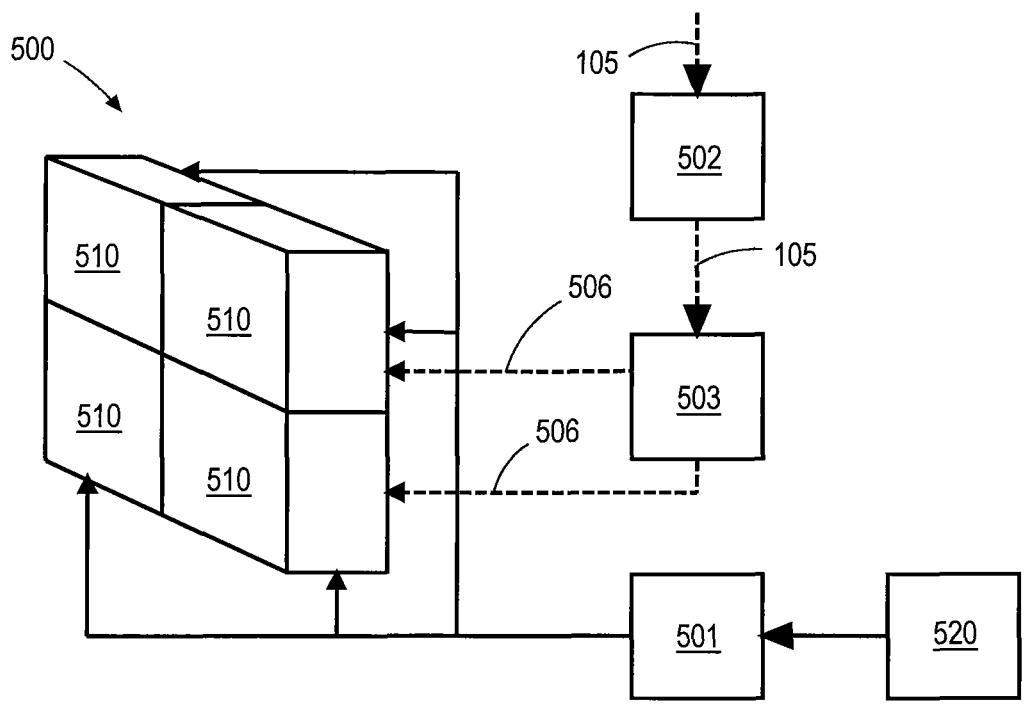
FIG. 5 illustrates one example of a 2×2 tiled display device that may benefit from embodiments of the invention.

Tiled display walls provide a large-format environment for presenting high-resolution visualizations by coupling together the output from multiple projectors. Such large displays may be created by tiling a plurality of smaller display devices together. For example, the video walls frequently seen in the electronic media typically use multiple electronic display devices, such as display system 100 or LPD 200, which are tiled to create such large displays. Embodiments of the invention contemplate displaying an image on a tiled display wall device at a reduced brightness and power level to avoid exceeding a predetermined maximum allowable power consumption by the tiled display wall. FIG. 5 illustrates one example of a 2×2 tiled display device 500 that may benefit from embodiments of the invention.

Tiled display device 500 includes a plurality of electronic display devices 510 mounted to a display frame (not shown for clarity). In the example illustrated in FIG. 5, four electronic display devices 510 are mounted together in a 2×2 array. Other configurations of multiple electronic display devices, e.g., 1×4, 2×3, 5×6, etc., may also benefit from embodiments of the invention. Each of electronic display devices 510 is substantially similar in organization and operation to display system 100 in FIG. 1, except that the electronic display devices 510 of tiled display device 500 are configured to operate in combination with each other to display a single large format image or video sequence, rather than four independent images or video sequences. Tiled display device 500 includes a main power supply 501, a memory block 502, and a central controller 503. Main power supply 501 is configured to distribute electrical power to each of electronic display devices 510, and receives such power from a single point power source 520. Single point power source 520 may be a conventional electrical outlet, such as a 110 VAC or 220 VAC electrical outlet, a hard-wired electrical connection, or other electrical connection that provides the requisite voltage and amperage for the proper operation of tiled display device 500. Memory block 502 may include DRAM, flash memory, or other memory devices for retaining image data 105 that is used to construct one or more images to be displayed by tiled display device 500. Central controller 503 is substantially similar to controller 103 in FIG. 1, but is further configured to separate image data 105 in memory block 502 into output signals 506 and to direct each of output signals 506 to the appropriate electronic display device 510 so that a coherent image or video sequence is displayed by tiled display device 500.

In operation, tiled display device 500 receives and stores image data 105 in memory block 502. Central controller 503 extracts image data 105 for a single video frame or static image from memory block 502, and calculates the total power required for tiled display device 500 to display the frame or image. Central controller 503 then compares the calculated power to a pre-determined maximum allowable power limit, i.e., a power ceiling, for tiled display device 500. The predetermined power ceiling for tiled display device 500 is a user-defined or default quantity and may depend on a number of factors, including the maximum power available from single point power source 520, a maximum desired brightness of tiled display device 500, etc. If the calculated power to display the image exceeds the power ceiling for tiled display device 500, central controller 503 uniformly dims the frame or image by scaling the brightness of each pixel and subpixel accordingly, so that tiled display device 500 uses a power level below the predetermined power ceiling to produce the image. Controller 503 then sends the appropriate output signals 506 to each electronic display device 510. Together, the electronic display devices 510 produce the image or video frame at a brightness that ensures that the power ceiling of tiled display device 500 is not exceeded. It is noted that the four portions of the image corresponding to each of the electronic display devices 510 are each scaled down in brightness in the same way, so that the overall appearance of the image is uniform, and this is reflected in the data contained in output signal 506 for each electronic display device 510. In some embodiments, the image brightness of one or more of the electronic display devices 510 may be scaled down more than the others. This can be done by using a different set of mapping functions, the use of which are further described below.

According to one or more embodiments, calculating the total power required for an electronic display device, e.g., display system 100, to display an image includes determining the average power level (APL) of the image to be displayed on the display screen of the device, e.g., display screen 104. In terms of display system 100, the APL of an image is defined herein as the ratio (expressed in percent) of the power required by display screen 104 to produce the image at the power required by display screen 104 to produce a fully white screen. Thus, if display screen 104 has 100 pixels (each with three RGB sub-pixels), and the image to be displayed is made up of 10 fully white pixels, the APL of the image is 10%. APL quantifies the power required to display an image with respect to the maximum possible power draw of display screen 104. In addition, because the power ceiling for display screen 104 can also be quantified in terms of percentage of the total possible power draw of display screen 104, determining APL of an image allows controller 104 to quickly determine whether the brightness of an image should be reduced. Further, determining image APL facilitates the use of APL mapping functions, which, according to some embodiments, can be used to define precisely how much an image should be dimmed.

In one embodiment, APL of an image is determined and APL mapping functions are then used to define if and how much the brightness of the image is reduced in order to display the image with an electronic display device while using less power than a predetermined power ceiling for the display device. In terms of an LPD, such as LPD 200, for which laser input power is substantially equal to the optical intensity of the output, APL may be defined by the following equation:

$$APL = \sum_{i=1}^{i=N} I_i * \frac{1}{255*N}$$

where N is the total number of subpixels of LPD 200 and I is the intensity of optical output of a subpixel (measured in DAC counts, i.e., from 0 to 255). In this embodiment of APL determination, 0 DAC counts corresponds to no light generation by the subpixel and 255 DAC counts to maximum light generation by the subpixel. It is noted that for other electronic display devices, the above definition of APL may require modification to compensate for a non-linear relationship between input power and output intensity and/or other inefficiencies of the light-generating apparatus. Once the initial APL has been determined for a frame or image, a previously defined mapping function can be used to quantify the attenuation of each subpixel from an initial optical output to an adjusted optical output, thereby reducing the power required to display the image below a pre-determined power ceiling.

Figure 6:
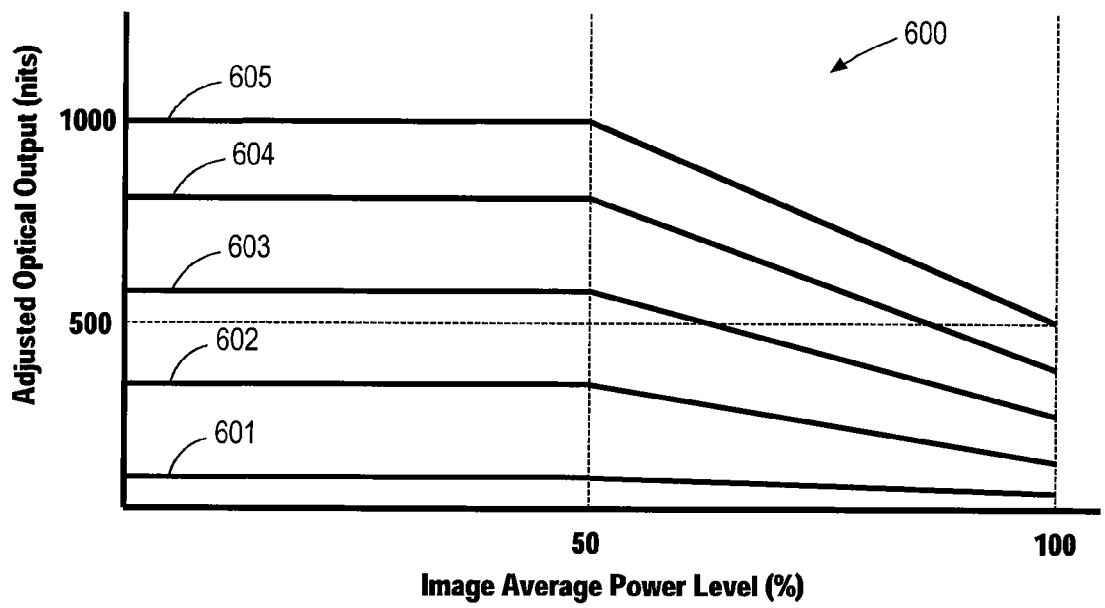
FIG. 6 is a graph illustrating a family of average power level (APL) mapping functions that may be used to define the dimming of an image to be displayed by an LPD, according to embodiments of the invention.

FIG. 6 is a graph 600 illustrating a family of APL mapping functions 601-605 that may be used to define the attenuation of an image to be displayed by an LPD, according to embodiments of the invention. In an exemplary embodiment used to describe the role of APL mapping functions, LPD 200 is an LPD-based display device having a power ceiling of 50 W and a total possible output of 100 W when displaying a full white screen at 1000 cd/m² (also referred to as nits).

Each of APL mapping functions 601-605 defines the adjusted optical output of a subset of subpixels as a function of image APL, where the subset of subpixels includes subpixels having the same initial optical output value. APL mapping function 605 describes the adjusted optical output as a function of image APL for all subpixels forming an image that have an initial optical output of 255 DAC counts, i.e., maximum optical output. Similarly, APL mapping function 603 describes the adjusted optical output for subpixels having initial optical outputs of 200 DAC counts, APL mapping function 602 describes the adjusted optical output for subpixels having initial optical outputs of 150 DAC counts, etc. For clarity, only five APL mapping functions are depicted in graph 600. In practice, a large number of APL mapping functions may be used to specify adjusted optical output, for example, one APL mapping function may be established for each initial optical output DAC count from 0 to 255. Alternatively, fewer APL mapping functions may be established to define adjusted optical output, e.g., one mapping function for every 10 DAC counts, and an interpolation scheme may be used to determine an adjusted optical output of subpixels having an initial optical output falling between the established DAC count values. As shown, in the embodiment illustrated in FIG. 6, APL mapping function 601 remains substantially constant at 1000 nits when APL of an image to be displayed is less than or equal to 50%. For images determined to have APL greater than 50%, APL mapping function 601 decreases from 1000 nits when image APL is 50% to 500 nits when image APL is 100%. Similarly, the remaining APL mapping functions 602-605 decrease in a corresponding fashion. As noted above, in this embodiment LPD 200 has a power ceiling of 50 W but a possible maximum power draw of 100 W when displaying a full white screen, i.e., when all subpixels are at 1000 nits or 255 DAC counts. Thus, if LPD 200 were to display an image having an image APL greater than 50%, the power ceiling of 50 W would be exceeded if the subpixels of LPD 200 display the image at the original optical output. Inspection of FIG. 6 reveals that as image APL increases above 50%, the optical output of each subpixel of LPD 200 is scaled down to an adjusted optical output as indicated by APL mapping functions 601-605, so that the 50 W power ceiling of LPD 200 will not be exceeded and the relative brightness and overall appearance of the image will not be altered.

Figure 7:
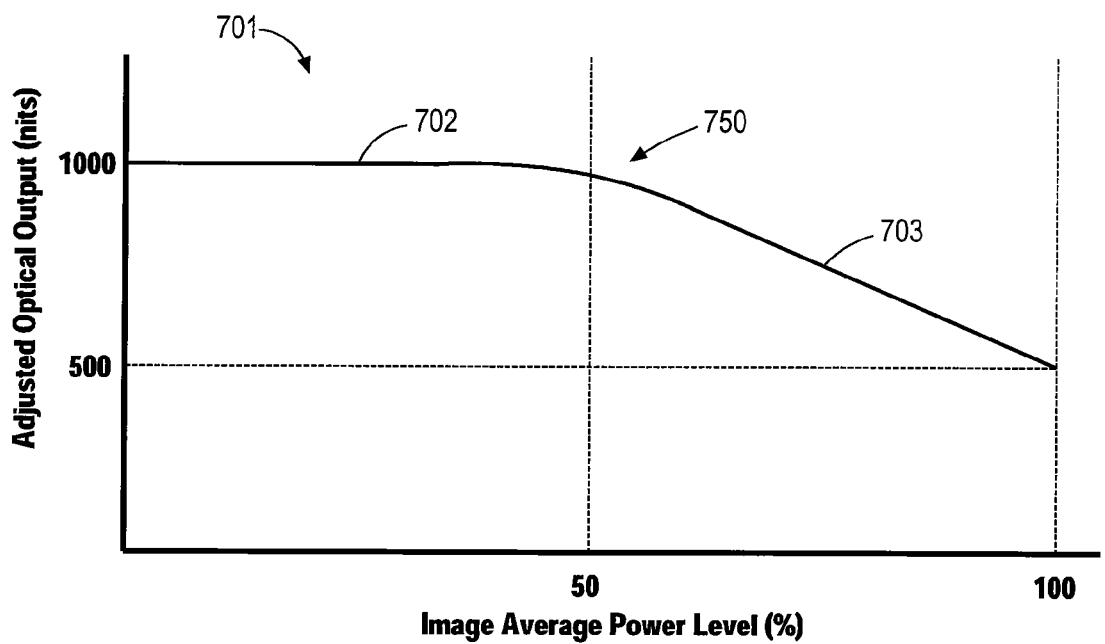
FIG. 7 illustrates an APL mapping function having a smooth transition between a constant value portion of the APL mapping function and a decreasing slope portion thereof.
Figure 8:
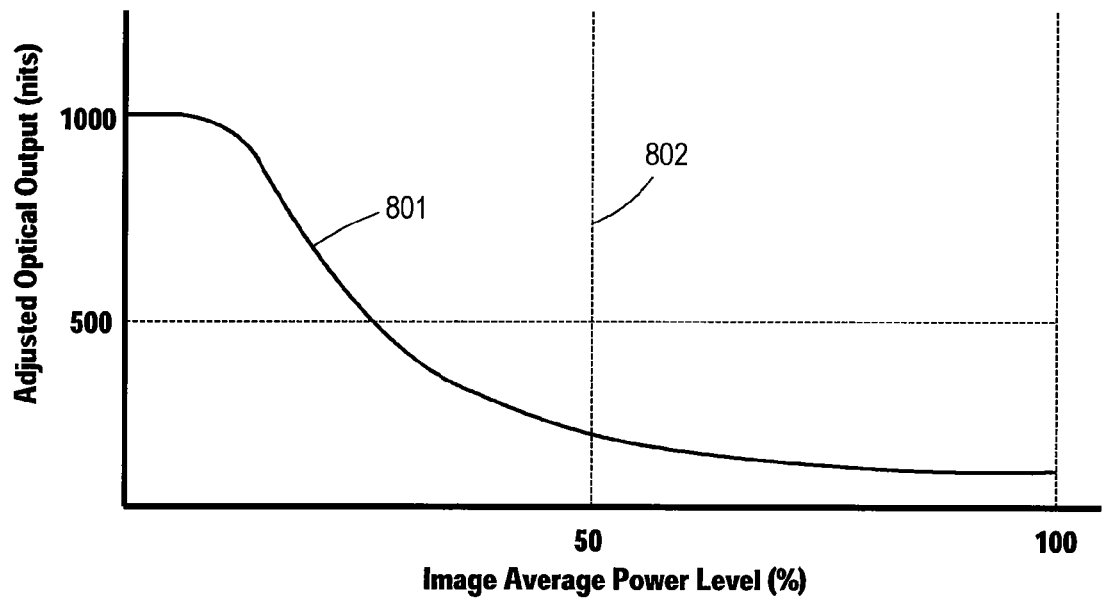
FIG. 8 illustrates an APL mapping function having a relatively steep attenuation of the adjusted optical output that occurs well before the image APL that corresponds to the power ceiling of an LPD.

The APL mapping functions 601-605 are only one example of such mapping functions contemplated by embodiments of the invention. The particular features of the APL mapping functions, such as the slope of the mapping functions and the position of the inflection point of the mapping functions, depend on a number of factors, including the maximum possible power draw of LPD 200, the pre-determined power ceiling of LPD 200, and physiological factors related to the human eye. For example, if the maximum possible power draw of LPD 200 is 1000 W and the power ceiling of LPD 200 is 300 W, then the scaling downward of APL mapping functions 601-605 may occur at an image APL no greater than 30%, rather than at 50% as shown in FIG. 6. In some embodiments, the power ceiling itself may be limited by external factors. For example, when power source 101 is a standard 110 VAC, 20 A electrical outlet, the power ceiling of LPD 200 cannot exceed the 2 kW rating of the electrical outlet. In another embodiment, the sharp inflection point 620, as shown in FIG. 6 for APL mapping functions 601-605, is contemplated in some embodiments, but in other embodiments a smooth transition may occur between the constant value portion of APL mapping functions 601-605 and the decreasing slope portion thereof. FIG. 7 illustrates an APL mapping function 701 having a smooth transition 750 between a constant value portion 702 of APL mapping function 701 and a decreasing slope portion 703 thereof. Smooth transition 750 may provide a more gradual transition in the dimming of a video sequence, i.e., the increased dimming of a series of video frames over which APL continually increases. A more gradual transition can make such dimming of a video sequence less noticeable to a viewer. In some embodiments, the constant value portion of APL mapping functions 601-605 as illustrated in FIG. 6 is reduced and/or eliminated. FIG. 8 illustrates an APL mapping function 801 having a relatively steep attenuation of the adjusted optical output that occurs well before the image APL 802 that corresponds to the power ceiling of LPD 200.

Figure 9:
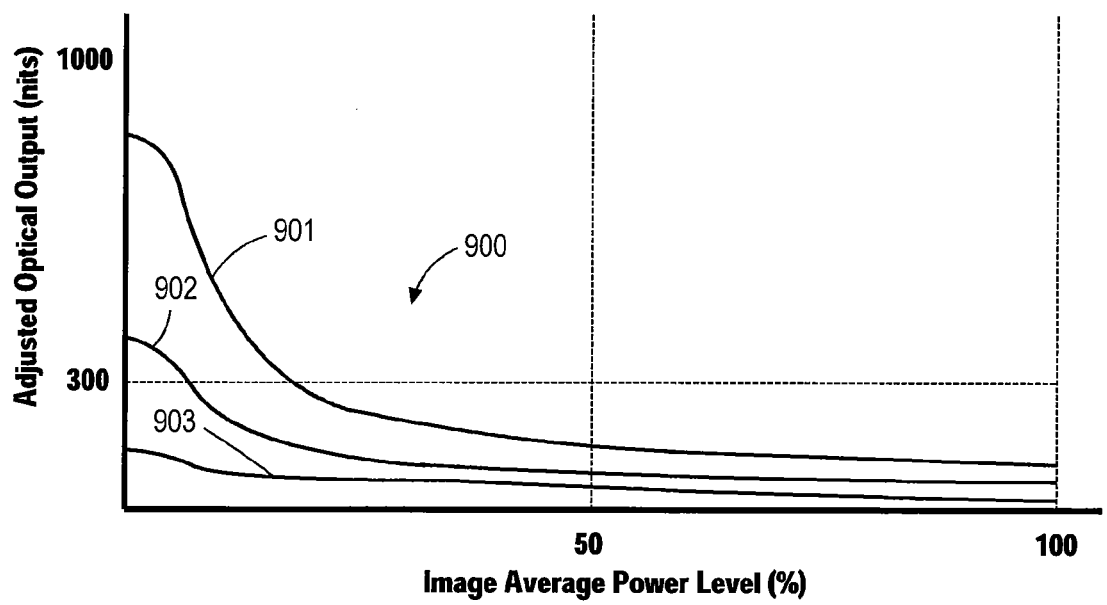
FIG. 9 illustrates a family of APL mapping functions according to an embodiment of the invention.

Other APL mapping curves are also contemplated by embodiments of the invention. In some embodiments, when most of an image has relatively low brightness and a small percentage of the image has brighter pixels, an APL mapping function is used in which the adjusted optical output of the brighter subpixels is increased. In such an embodiment, the brightest subpixels making up the image are scaled upward in brightness, so that these brighter subpixels may have an adjusted optical output that is higher than their initial optical output. Thus, for an image having very low APL values, e.g., under about 20%, the adjusted optical output of subpixels in the image that are at or near 100% output are increased in brightness. Images produced by such an embodiment can be qualitatively more pleasing to the human eye than an image in which the small number of bright pixels are scaled downward from 100% optical output. FIG. 9 illustrates a family of APL mapping functions 900 according to such an embodiment of the invention. APL mapping function 901 specifies, as a function of image APL, the adjusted optical output of subpixels in an image having 100% optical output, where 300 nits is defined as 100% optical output. APL mapping function 902 specifies the adjusted optical output of subpixels in an image having 60% optical output, and APL mapping function 903 specifies the adjusted optical output of subpixels in an image having 20% optical output. As shown, for low-APL images, the brighter subpixels are increased in intensity to a brightness value greater than the nominal maximum optical output for the subpixel, which in this example is 300 nits. Because the adjusted optical output of only a small number of pixels is increased in this way, and because such an adjustment occurs only when image APL is relatively low, the power ceiling for LPD 200 will not be violated in such an embodiment.

In some embodiments, an electronic display device may use different APL mapping functions at different times. For example, a reduction in total available electrical power for an electronic display device may result in a different power ceiling for the display device. Because APL mapping functions are based in part on the power ceiling for a display device, different APL mapping functions may be used by the display device for different available power scenarios. Similarly, a user may select different APL mapping functions as ambient light conditions change. For example, maximum brightness of the adjusted optical output subpixels may be modified based on ambient light conditions. Alternatively, the overall shape of the APL functions being used may be altered as ambient brightness changes, in order to better satisfy the physiological needs of the human eye.

As described above, image APL may be calculated and APL mapping functions applied to a static image or an individual frame of a video sequence to generate adjusted optical output values for each subpixel of the image or frame. In order to provide more gradual dimming or brightening of the frames making up a video sequence, in some embodiments image APL is calculated based on a plurality of frames. For example, image APL may be a time average of multiple frames, e.g., the ten most recent frames in a video sequence. In such an embodiment, dimming or brightening of a video sequence may be less noticeable to a viewer. The number of frames that is time averaged may be selected in view of the physiological needs of the human eye (e.g., to reduce eye fatigue in video sequences where the image APL fluctuates at a high rate).

Figure 10:
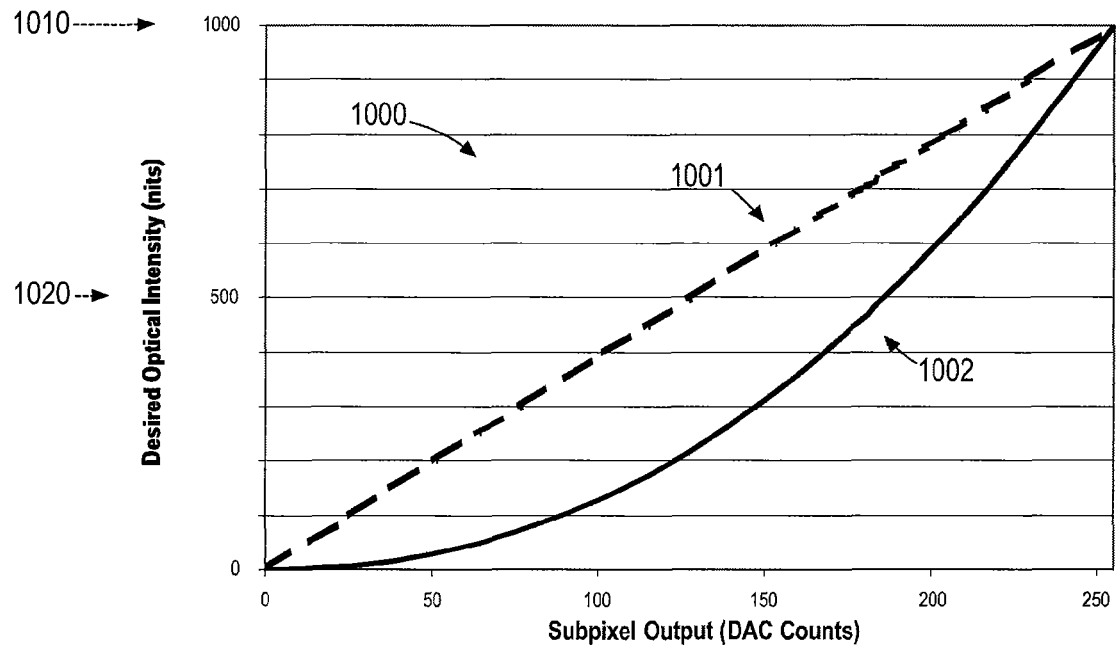
FIG. 10 is a graph of desired optical intensity of a subpixel (in nits) as a function of optical output intensity of the subpixel or other light source (in DAC counts), where two gamma values are compared.

Embodiments of the invention further contemplate maintaining a constant value for gamma correction when attenuating the brightness of an image from an initial optical output intensity to an adjusted optical output intensity. By holding gamma correction constant when the APL of a received image is reduced prior to display, the image will not be altered significantly in appearance. Gamma correction, often simply referred to as "gamma," is a nonlinear operation used to code and decode luminance in video or still image systems. In order to maintain constant gamma for an image when the image brightness is attenuated according to embodiments of the invention, e.g., using a family of APL mapping functions, the adjusted optical output intensity for each subpixel is modified accordingly as a function of gamma. FIG. 10 is a graph 1000 of desired optical intensity of a subpixel (in nits) as a function of optical output intensity of the subpixel or other light source (in DAC counts), where two gamma values are compared. In the example illustrated in FIG. 10, a setting of 255 DAC counts for the subpixel produces a maximum output of 1000 nits and a setting of 0 DAC counts produces essentially no optical output, or 0 nits. Graph 1000 includes function 1001, which illustrates the desired optical intensity vs. DAC counts when gamma equals 1.0, and function 1002, which illustrates the desired optical intensity vs. DAC counts when gamma equals 2.2.

For fully saturated images, gamma is typically equal to 1 and there is a linear relationship between DAC counts applied to a subpixel and the desired optical intensity of the subpixel. Thus, when an APL mapping function specifies that an initial optical output value 1010, e.g., 1000 nits, should be reduced to an adjusted optical output value 1020, e.g., 500 nits, the DAC counts controlling the output intensity of the subpixel are reduced proportionally from 255 DAC counts to 128 DAC, since 255*(500/1000)=128. In video sequences, gamma is generally set equal to 2.2 for reduced eye strain and a more natural-appearing image. As shown in graph 1000, there is a non-linear relationship between DAC counts applied to a subpixel and the desired optical intensity of the subpixel, which reflects the more readily perceived differences in lower intensity images by the human eye. Thus, when an APL mapping function specifies that initial optical output value 1010 should be reduced to adjusted optical output value 1020, the DAC counts controlling the output intensity of the subpixel are reduced from 255 DAC counts to 186 DAC counts (instead of 128 DAC counts). Similarly, other DAC count values for a subpixel can be determined from the relationship depicted in FIG. 10 by function 1002 when a gamma of 2.2 is to be maintained when attenuating the subpixels of an image to an adjusted optical output.

In embodiments of the invention in which the value of gamma is considered when attenuating the brightness of an image from an initial optical output intensity to an adjusted optical output intensity, image APL may be determined using the following equation:

$$APL = \sum_{i=1}^{i=N} I_i^\gamma * \frac{1}{255 * N}$$

where N is the total number of subpixels of LPD 200 and I is the intensity of optical output of a subpixel (measured in DAC counts, i.e., from 0 to 255).

According to some embodiments of the invention, a tiled display, such as tiled display device 500 in FIG. 5, may also use APL mapping functions to define if and how much the brightness is reduced for an image to be displayed by the tiled display. In such embodiments, the image is displayed using less power than a predetermined power ceiling for the tiled display device. The predetermined power ceiling may be based on the available power for the tiled display device. For example, when single point power source 520 of tiled display device 500 is a standard 110 VAC, 20 A electrical outlet, the power ceiling of tiled display device 500 cannot exceed the 2 kW rating of the electrical outlet. In such embodiments, the APL of the entire image is calculated, rather than the APL for each individual electronic display device mounted together to form the tiled display device. Further, APL mapping functions used are applied uniformly to all pixels and subpixels of the tiled display device regardless of which particular electronic display device a subpixel is an element of. The same APL mapping functions are applied uniformly to all subpixels of all electronic display devices to prevent non-uniform attenuation of an image.

Figure 11:
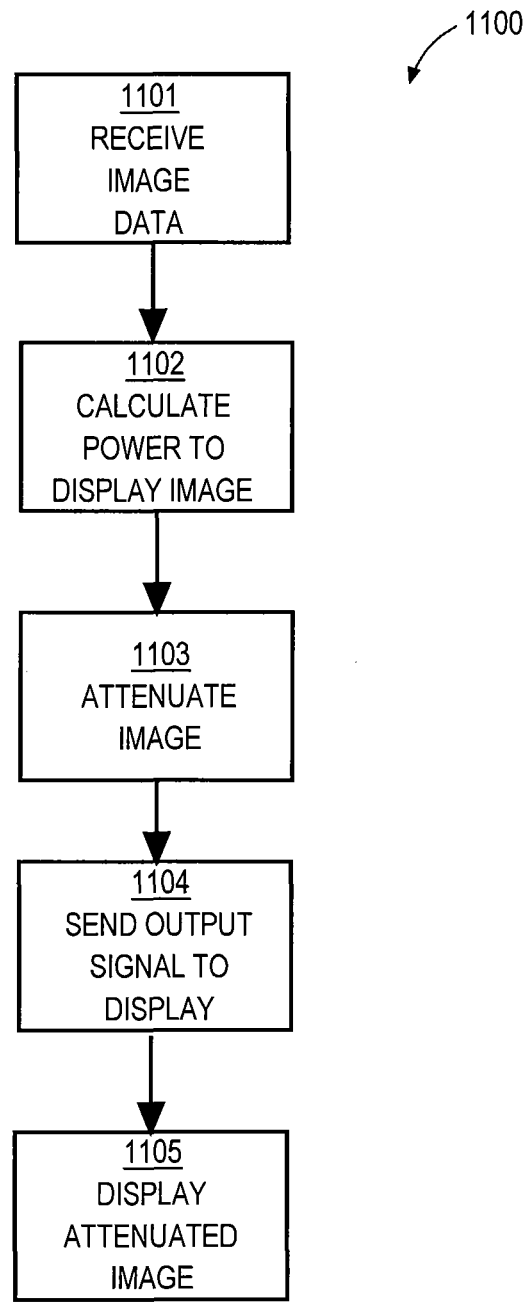
FIG. 11 is a flow chart that summarizes, in a stepwise fashion, a method for displaying an image on an electronic display device at a reduced power level, according to embodiments of the invention.

FIG. 11 is a flow chart that summarizes, in a stepwise fashion, a method 1100 for displaying an image on an electronic display device at a reduced power level, according to embodiments of the invention. By way of illustration, method 1100 is described in terms of an LPD-based electronic display device substantially similar to LPD 200 in FIG. 2. However, other electronic display devices may also benefit from the use of method 1100. Prior to the first step of method 1100, a user-selected power ceiling is selected. Such a power ceiling may be determined based on a variety of factors, including the capacity of power source 101. Based on the power ceiling for LPD 200 and the maximum possible power use of LPD 200, which in a multi-tiled display depends on the total number of display tiles, a family of APL mapping functions is constructed.

In step 1101, LPD 200 receives and stores image data 105 in memory block 102. Image data 105 includes digital information for constructing a single static image to be displayed by LPD 200 or a video sequence comprising a series of frames to be displayed by LPD 200. Image data 105 includes information such as the required intensity of each subpixel of screen 201 to produce the desired image or frame. In some embodiments, image data 105 includes digital information for constructing a plurality of frames in a video sequence.

In step 1102, controller 103 extracts image data 105 for a single video frame or static image from memory block 102, and calculates the total power required for display system 100 to display the frame or image.

In step 1103, controller 103 compares the calculated power to the pre-determined power ceiling for LPD 200. If the calculated power exceeds the power ceiling, controller 103 uniformly dims the frame or image by scaling the brightness of each pixel and subpixel to an adjusted optical output intensity. A family of APL mapping functions may be used to determine the adjusted optical output intensity for each subpixel as a function of image APL and of the initial optical output of the subpixel. In some embodiments, gamma correction is considered when attenuating the brightness of an image from an initial optical output intensity to an adjusted optical output intensity. Consequently, the value of gamma for the attenuated image will be substantially the same as the value of gamma for the original image, thereby minimizing visual artifacts noticeable by a viewer.

In step 1104, controller 103 sends output signal 106 to screen 201, which produces the image. Output signal 106 includes the control signals required to produce the image at a power below the maximum allowable power limit for LPD 200, including the modulation signals for each subpixel in screen. In embodiments in which LPD 200 is a multi-tiled display, controller 103 also divides the attenuated image into a plurality of separate images, each of which is sent to the appropriate display tile. In such embodiments, output signal 106 is a different signal for each display tile making up the multi-tiled display.

In step 1105, screen 201 displays the attenuated image based on output signal 106.

In sum, embodiments of the invention contemplate methods of displaying an image with an electronic display device to produce an image of a desired size and at a lower power than other display systems. Such methods provide long-term savings in energy costs to the user. In addition, by reducing the maximum power draw of the display device, such methods allow relatively large displays to operate using a standard, and often pre-existing power source. For example, by using embodiments of the invention, a relatively large display system may operate from a standard 110 VAC electrical outlet, thereby providing maximum flexibility in installation of the display and avoiding the complexity of installing specially sized wiring, circuit breakers, etc. Further, because embodiments of the invention lead to, on average, substantially lower power output for laser light sources that may be used as light sources, the lifetime of such lasers is significantly extended. Lastly, the user-defined power ceiling and APL mapping functions provide flexibility in performance of a display system that can be optimized by the user based on changing power availability, ambient lighting conditions, and so on.

While the foregoing is directed to embodiments of the present invention, other and further embodiments of the invention may be devised without departing from the basic scope thereof, and the scope thereof is determined by the claims that follow.

We claim:

1. A method of displaying an image on an electronic display system, comprising:
   receiving frames of image data to be displayed, wherein the image data includes an optical output intensity of each pixel and subpixel of a display device of the display system to produce the image or frame and the sub-pixels are red, green, and blue subpixels;
   determining an average power level for displaying one or more frames of image data, wherein the average power level is defined as the ratio of the power required by the display device to produce an image at the power required by the display device to produce a fully white screen;
   determining an adjusted optical output intensity for each pixel and subpixel as a function of the average power level and the optical output intensity of each subpixel;
   adjusting a parameter of the electronic display system in accordance with the average power level, wherein adjusting a parameter comprises scaling the brightness of each pixel and subpixel to the adjusted optical output intensity; and
   wherein the electronic display system includes multiple display devices and each display device displays a portion of the image data.

2. The method of claim 1, wherein the average power level is determined based on a single frame of image data.

3. The method of claim 1, wherein the average power level is determined based on multiple frames of image data.

4. The method of claim 3, wherein the parameter is continuously set each time a frame of image data is displayed, based on the average power level that is determined from a running average of the multiple frames of image data.

5. The method of claim 1, wherein said adjusting includes scaling down a brightness level of the electronic display system.

6. The method of claim 5, wherein the brightness level of the electronic display system is scaled down in accordance with a function that maps target brightness levels to average power levels.

7. The method of claim 1, wherein said adjusting includes scaling down a power level of the electronic display system.

8. The method of claim 7, wherein the power level of the electronic display system is scaled down in accordance with a function that maps target power levels to average power levels.

9. The method of claim 1, wherein the parameter is adjusted so as to maintain a desired gamma.

10. The method of claim 1, wherein the average power level is defined by the following equation:

$$APL = \sum_{i=1}^{i=N} I_i * \frac{1}{255*N}$$

where N is the total number of subpixels of the display device and I is the intensity of optical output of a subpixel (measured in DAC counts).

11. A method of displaying an image on a laser phosphor display device having a plurality of laser sources, comprising:
receiving frames of image data to be displayed, wherein the image data includes an optical output intensity of each pixel and subpixel of a display device of the display system to produce the image or frame and the sub-pixels are red, green, and blue sub-pixels;
determining an average power level for displaying one or more frames of image data, wherein the average power level is defined as the ratio of the power required by the display device to produce an image at the power required by the display device to produce a fully white screen;
determining an adjusted optical output intensity for each pixel and subpixel as a function of the average power level and the optical output intensity of each subpixel; and
modulating the laser sources in accordance with the average power level, wherein the laser phosphor display device includes two or more distinct display modules and each display module displays a portion of the image data frame, each frame of image data is to be displayed on the distinct display modules simultaneously as a single image.

12. The method of claim 11, wherein the laser sources are modulated in accordance with a plurality of maximum intensity settings, each of which is set based on the average power level.

13. The method of claim 12, wherein the maximum intensity settings increase as the average power level decreases.

14. The method of claim 13, wherein the rates at which the maximum intensity settings increase as the average power level decreases differ, and the highest maximum intensity setting has the highest rate of increase and the lowest maximum intensity setting has the lowest rate of increase.

15. The method of claim 11, wherein the average power level is determined based on a running average of N frames of image data, N being at least 2.

16. The method of claim 11, wherein the average power level is defined by the following equation:

$$APL = \sum_{i=1}^{i=N} I_i * \frac{1}{255*N}$$

where N is the total number of subpixels of the display device and I is the intensity of optical output of a subpixel (measured in DAC counts).

17. A method of displaying images on a display device, comprising:
receiving an input representing one or more images to be displayed;
determining a display output intensity value based on the input;
comparing the display output intensity value against a maximum allowed brightness value; and
adjusting a parameter of the display device based on said comparing, wherein the display device includes two or more distinct display modules, each display module displays a portion of one image to be displayed, and the input is to be displayed on the distinct display modules simultaneously as a single image, wherein adjusting a parameter comprises scaling a brightness of each pixel and subpixel.

18. The method of claim 17, wherein the input represents a sequence of images to be displayed.

19. The method of claim 17, wherein the threshold value varies depending on the display value.

20. An electronic display system having:
multiple display devices, each of which displays a portion of image data;
a processing unit; and
a memory device having instructions stored therein, wherein the processing unit executes the instructions to carry out the steps of:
receiving frames of image data to be displayed, wherein the image data includes an optical output intensity of each pixel and subpixel of a display device of the display system to produce the image or frame and the sub-pixels are red, green, and blue subpixels;
determining an average power level for displaying one or more frames of image data, wherein the average power level is defined as the ratio of the power required by the display device to produce an image at the power required by the display device to produce a fully white screen;
determining an adjusted optical output intensity for each pixel and subpixel as a function of the average power level and the optical output intensity of each subpixel; and
adjusting a parameter of the electronic display system in accordance with the average power level, wherein adjusting a parameter comprises scaling the brightness of each pixel and subpixel to the adjusted optical output intensity.

21. The system of claim 20, wherein the average power level is determined based on a single frame of image data.

22. The system of claim 20, wherein the average power level is determined based on multiple frames of image data.

23. The system of claim 22, wherein the parameter is continuously set each time a frame of image data is displayed, based on the average power level that is determined from a running average of the multiple frames of image data.

24. The system of claim 20, wherein said adjusting includes scaling down a brightness level of the electronic display system.

25. The system of claim 24, wherein the brightness level of the electronic display system is scaled down in accordance with a function that maps target brightness levels to average power levels.

26. The system of claim 20, wherein said adjusting includes scaling down a power level of the electronic display system.

27. The system of claim 26, wherein the power level of the electronic display system is scaled down in accordance with a function that maps target power levels to average power levels.

28. The system of claim 20, wherein the parameter is adjusted so as to maintain a desired gamma.

29. The method of claim 20, wherein the average power level is defined by the following equation:

$$APL = \sum_{i=1}^{i=N} I_i * \frac{1}{255*N}$$

where N is the total number of subpixels of the display device and I is the intensity of optical output of a subpixel (measured in DAC counts).

30. A computer-readable storage medium including instructions that, when executed by a processing unit, cause the processing unit to display images on a display device, by performing the steps of:
receiving an input representing one or more images to be displayed on the display device;
determining a display value based on the input;
comparing the display value against a threshold value; and
adjusting a parameter of the display device based on said comparing, wherein the display device includes two or more distinct display modules, each display module displays a portion of one image to be displayed and the input is to be displayed on the distinct display modules simultaneously as a single image, wherein adjusting a parameter comprises scaling a brightness of each pixel and subpixel.

31. The computer-readable storage medium of claim 30, wherein the display value is a power value and the threshold value is a maximum allowed power value.

32. The computer-readable storage medium of claim 30, wherein the display value is a display output intensity value and the threshold value is a maximum allowed brightness value.

33. The computer-readable storage medium of claim 30, wherein the input represents a sequence of images to be displayed.

34. The computer-readable storage medium of claim 30, wherein the threshold value varies depending on the display value.

* * * * *